United States Patent [19]
Roberts

[11] 4,371,833
[45] Feb. 1, 1983

[54] SPEED SWITCH

[75] Inventor: William J. Roberts, Toledo, Ohio

[73] Assignee: Eltra Corporation, Toledo, Ohio

[21] Appl. No.: 158,658

[22] Filed: Jun. 11, 1980

[51] Int. Cl.³ .............................................. G01P 3/56
[52] U.S. Cl. .................................. 324/161; 123/352; 318/615
[58] Field of Search ............... 324/161, 168, 169; 318/601, 615, 635, 639, 651; 123/352; 323/241, 322

[56] References Cited

U.S. PATENT DOCUMENTS

| | | | |
|---|---|---|---|
| 3,588,698 | 6/1971 | Ashcraft | 324/169 |
| 3,706,035 | 12/1972 | Hoehn | 324/169 |
| 4,086,888 | 5/1978 | Roberts | 123/352 X |

OTHER PUBLICATIONS

Marston, Solid-State Tach and Add-on Speed Alarm, Radio-Electronics, Apr. 1970, pp. 33-38.
Young, Precision Auto Tachometer Squelches Point Bounce, Electronics, Dec. 18, 1972, p. 106.

*Primary Examiner*—Stanley T. Krawczewicz
*Attorney, Agent, or Firm*—James P. DeClercq

[57] ABSTRACT

A speed limiting indicating device for an internal combustion engine having an engine speed sensor providing a first signal indicative of engine speed, means responsive to said first signal for providing a speed limit signal indicative of said engine speed exceeding a predetermined speed limit, said speed limit signal means including a logic gate having its input connected to said first signal for providing said speed limit signal at said predetermined limit speed.

16 Claims, 5 Drawing Figures

SPEED SWITCH

FIELD OF THE INVENTION

This is a device for sensing the speed of a device, as may be indicated by the frequency of a periodic signal, exceeding a speed limit by either falling below that limit or rising above that limit. It is useful in controlling the speed of such devices as internal combustion engines or any other rotating machinery capable of producing a periodic signal indicative of the rotational speed.

BACKGROUND

Many devices exist for sensing engine speed. Each provides a signal having a frequency or a period indicative of that speed.

Some of these devices provide an indication of a predetermined speed or when that predetermined speed has been exceeded. A device may provide a speed signal indicating when a predetermined speed limit has been exceeded by an increasing speed passing through the speed limit and to a point above the speed limit or a decreasing speed passing through the speed limit in a downward direction to a point below the speed limit.

Many of these devices use a combination of timing circuits employing resistances and capacitances or other timing means.

An example of a resistance capacitance timing circuit speed switch is shown in U.S. Pat. No. 4,086,888.

These devices may be analogue or digital, especially where analogue techniques can be adapted to digital practices.

However, these prior art devices have been limited in temperature stability and in noise isolation capability which are important if not critical in the environment of the internal combustion engine and other rotating machinery.

SUMMARY OF THE PRESENT INVENTION

A speed limit indicating device is built of separate sections, each having a logic gate.

These gates may be NOR gates using CMOS devices and when the inputs of the CMOS NOR gates connected in common.

Each gate then provides an output only when the threshold of the gate is exceeded indicative of the engine reaching the predetermined speed limit.

The input to the device is a varying first signal from an engine speed sensor indicative of engine speed.

The output of the device, is a speed limit signal which is produced within one cycle of the first signal, at the predetermined speed limit.

A signal conditioning section is provided with feedback to drive the varying first signal level towards the response level of the conditioning circuit. In this way, the device may be used with a range of varying amplitude engine speed signals. Where the amplitude range of any respective engine speed signal is outside the response range of the conditioning section the feedback means will drive the varying input signal towards the section response area. Where the conditioning section is a gate, the response area is the gate threshold level.

As shown in the following disclosure, the conditioning section is a NOR gate.

Regardless of the amplitude range of the varying engine speed, the response area of the conditioning section relative to the phase of the varying input engine speed signal is maintained at substantially the same phase point of the varying input signal wave.

In this way, through the use of this signal conditioning section, a device can be used with a range of varying periodic input signals indicative of engine frequency and with each separate signal having a separate respective peak to peak amplitude and D.C. level.

This device further uses the CMOS devices as NOR gates in combination with respective timing circuits.

A first section comprises a first gate in combination with a first timing circuit to produce an intermediate speed limit signal.

The second section includes a second gate and second timing circuit producing the output speed limit signal.

The intermediate signal causes a speed limit signal to appear at the output of the second gate set.

The timing circuits are adjusted so that the output speed limit signal can be produced within the time period of a predetermined limit speed.

This device also provides a signal conditioning section which can be matched to a number of discrete time varying speed signals having separate and distinct amplitudes and D.C. levels.

Additionally, it utilizes CMOS devices having a greater temperature range and stability.

In particular, NOR gates are constructed of CMOS devices.

These and other features of the invention will be disclosed by reference of the following drawings in the following detailed description.

DESCRIPTION OF THE PREFERRED EMBODIMENT

Figure 1:
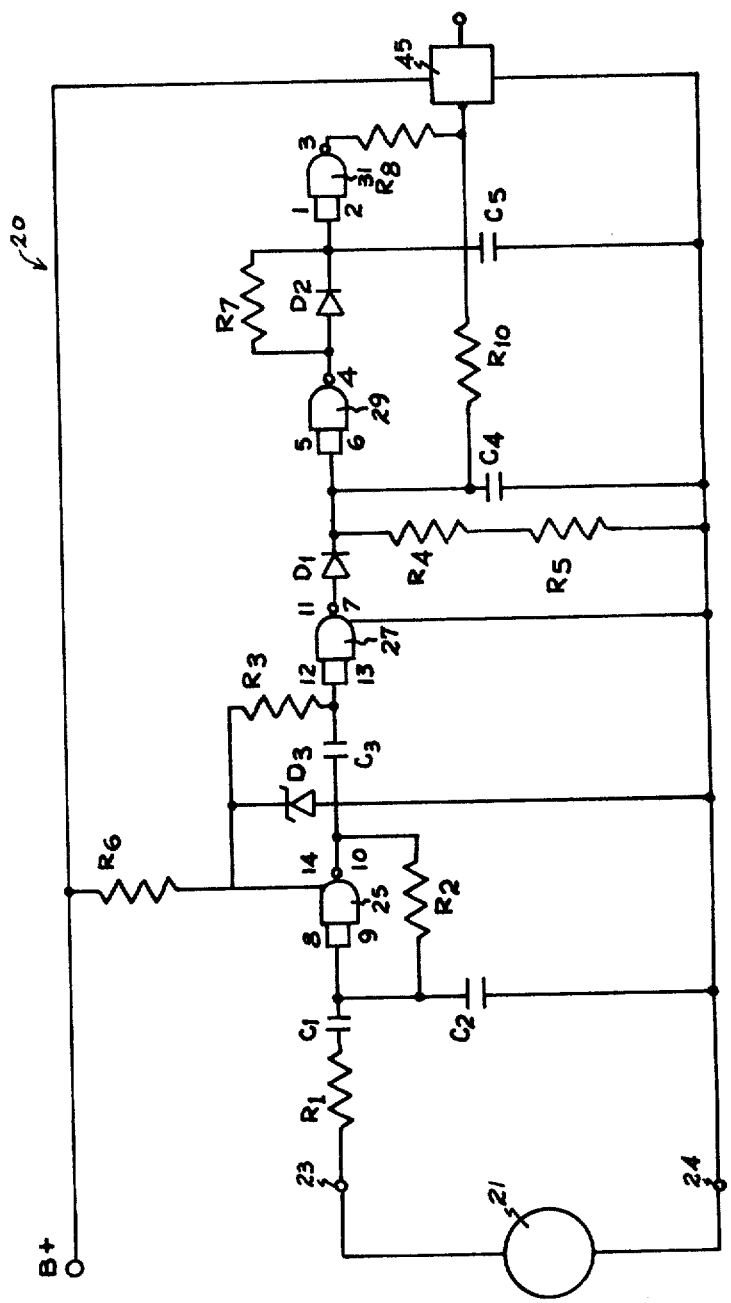
FIG. 1 is a schematic of the speed limiting device.

The speed limiting device is shown in FIG. 1 generally indicated by numeral 20.

A periodic signal source shown as 21 is connected to the device at terminals 23 and 24.

The periodic signal source provides a varying first signal which is a time varying signal periodically related to the frequency of the rotating device.

The device may be an internal combustion engine or any other rotating machine. The signal source may be a tachometer or any other device to provide a time varying periodic waveform indicative of the rotational speed. In the preferred embodiment, terminals 23 and 24 may be connected across breaker points in an internal combustion ignition to provide a series of pulses related to engine speed as shown in FIG. 2A.

A series of sections are built of respective gates 25, 27, 29 and 31. These gates use CMOS devices for the stability and temperature range advantage offered. One such CMOS device which may be used is a quad two input NOR gate shown as a Motorola MC 14001B.

The characteristic of the NOR gate as is well-known is an output high when both inputs are low.

Each of the gates 25, 27, 29 and 31 have their inputs connected in common so the outputs of each of the respective terminals 10, 11, 4 and 3 are high only when the input signal at terminals 8 and 9, 12 and 13, 5 and 6, and 1 and 2 respective are low.

One of the gates 25 is used within a signal conditioning section. Its function is to provide a periodic output at terminal 10 related to the periodicity of the engine speed signal at terminals 23, 24. Additionally, a feedback means is provided between the input terminals 8 and 9 and the output terminal 10 of the gate 25 to alter the varying speed signal amplitude and to advance or retard the phase of the input signal relative to the threshold level of the gate 25.

The varying input signal being the first signal indicative of speed, is filtered by an RC network comprising R1, C1 and C2. The filter network of R1, C1 and C2 provides AC filtering. The input waveform at terminals 23, 24 is shown in FIG. 2A and may be a square wave as shown.

Figure 2:
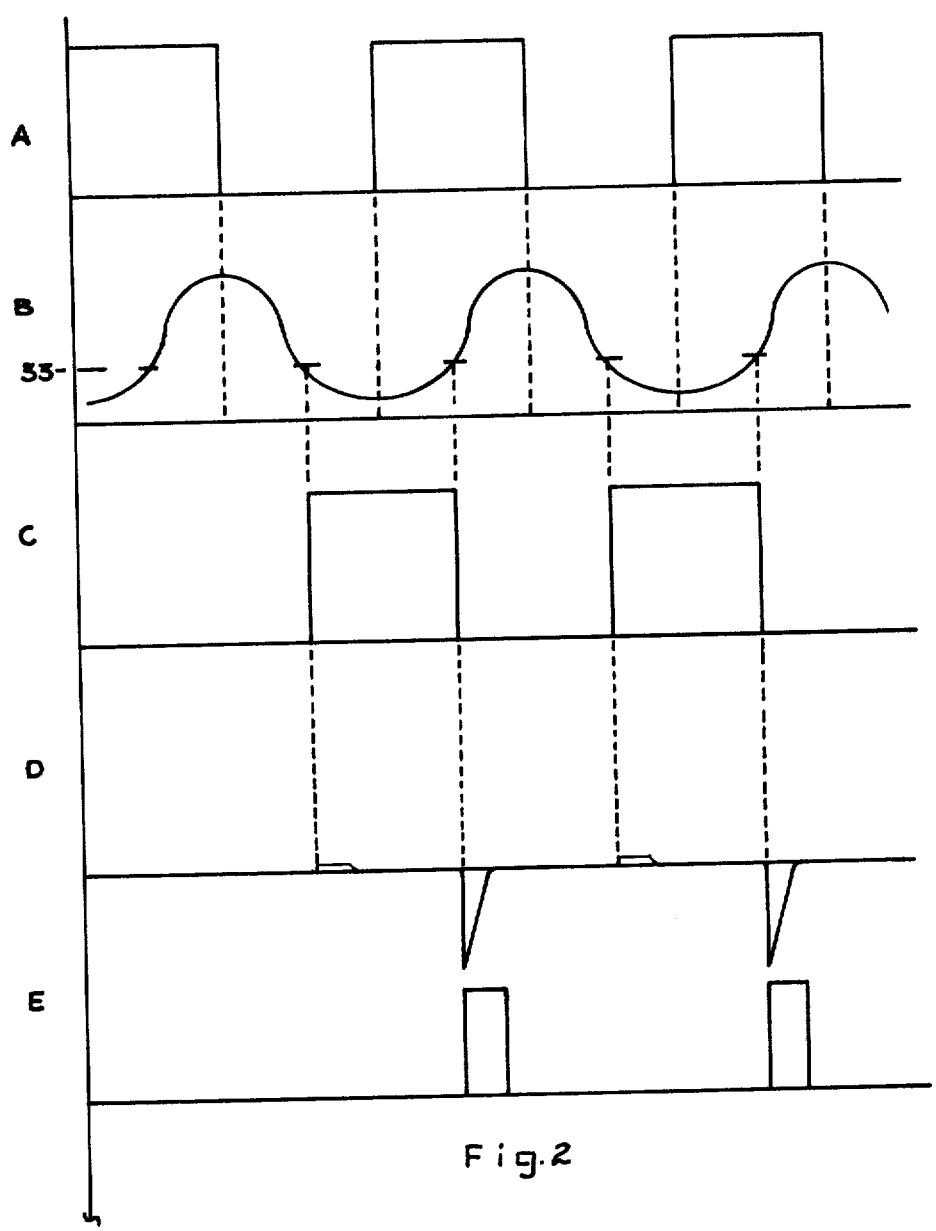
FIGS. 2 and 2a are related time diagrams of the signals at designated circuit points.
Figure 2A:
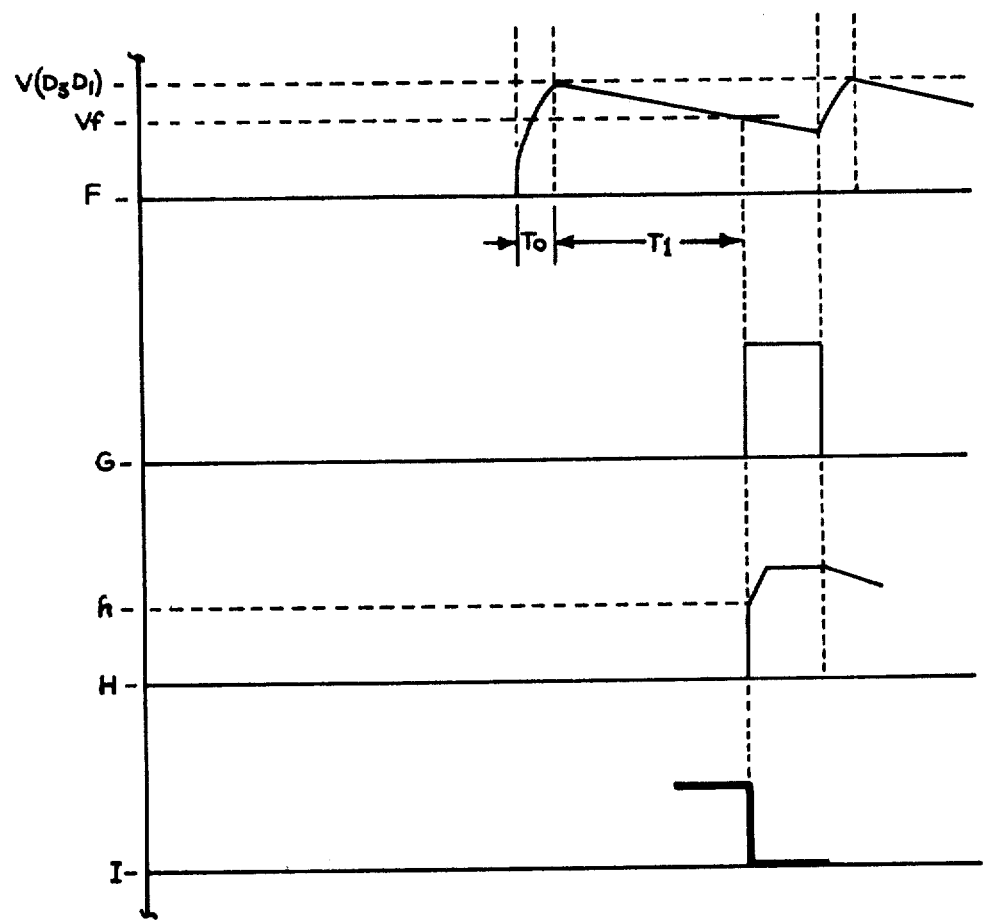

The signal at terminals 8 and 9 of NOR gate 25 is shown in FIG. 2B after being filtered and partially integrated by capacitor C2. The switching level is shown at amplitude level 33 for gate 25. The switching level is crossed each half cycle of the input signal.

As the gate 25 has a physically established threshold level 33, this threshold level will not necessarily be at the mid-point in phase or amplitude of the varying input waveform provided at terminals 8 and 9.

For example, the physical threshold level may be 4 volts and the amplitude of the time varying input waveform may have an amplitude varying from 1 to 5 volts with a DC level of 2 volts. The amplitude of the varying input signal will depend on the type of engine speed indicating device used.

The speed limiting device shown is responsive to a range of separate time varying amplitude speed signals which may appear at terminals 23, 24. A feedback means, which may be a resistance R2 connected between the input and output terminals of a gate 25 drives the signal at terminals 23, 24 toward the responsive area or threshold 33 of the conditioning section gate 25. In this way, where the response area of the conditioning section gate 25 is outside the first signal's varying amplitude, then the feedback means will cause the varying amplitude signal to be driven towards the response area and to vary about the response area.

As illustrated, the signal conditioning section includes gates 25 and 27, and provides constant width, constant amplitude pulses at a rate determined by signal source 21.

As seen in FIG. 2C, for the preferred embodiment, the output waveform at terminal 10 is high whenever the input waveform FIG. 2B falls below threshold level 33. Where the input signal amplitude is above the threshold level 33, the output of terminal 10 shown as 3C is low providing a low feedback DC level to terminals 8-9. This causes the varying input signal at the input terminals shown in FIG. 3B to be driven toward the threshold switching point 33, decreasing the duty cycle of the output FIG. 3C progressively until switching point 33 is stably within the amplitude excursions of the input signal.

Figure 4:
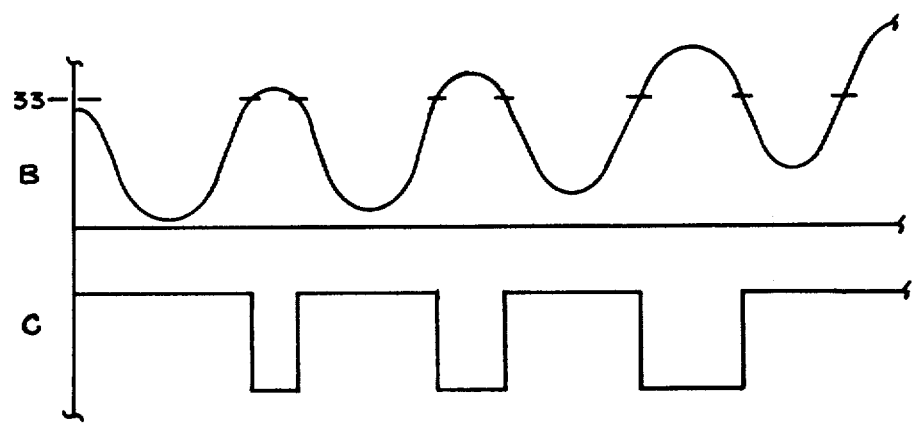

This situation can occur in the opposite direction as shown in FIGS. 4B and C where the time varying waveforms of FIG. 4B is shown below the response area of switching point of 33. As shown, the duty cycle of FIG. 4C is initially high as the switching point 33 of the gate 25 occurs above the amplitude range of the varying periodic signal appearing at input terminals 8 and 9.

The high D.C. feedback level, FIG. 4C, causes the amplitude of signal FIG. 4B to increase until it embraces the response area 33 and reaches a stable condition.

The feedback polarities and signal levels can be changed to be consistent with any suitable convention. Either positive or negative feedback may be used as is well-known in the art.

Figure 3:
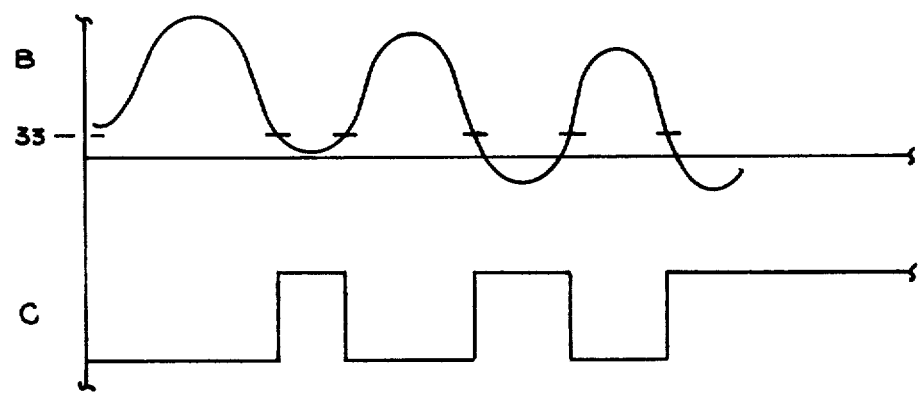
FIGS. 3(B and C) and 4(B and C) are related to FIGS. 2(B and C) and shows the effect of the signal conditioning section on the amplitude and phase relation input speed signal.

As shown in FIGS. 3B and 3C the switching point 33 of gate 25 is below the amplitude of the speed signal and is increased with regard to the input waveform in response to the output duty cycle in FIG. 3C.

This will provide more negative DC through feedback resistance R2 to terminals 8 and 9 driving the input DC level progressively lower as shown in FIG. 3B.

As shown in FIGS. 4B and C, where the amplitude of the time varying waveform is below the response area of threshold 33 of gate 25, the progressively decreasing duty data cycle provides less negative feedback to the varying speed signal waveform driving its D.C. level higher and to vary it about the response area 33 as shown in FIG. 4B.

As can be seen, the feedback means will cause a DC level to be applied to input terminals 8 and 9 of the signal conditioning means which will drive the absolute amplitude of the input varying speed signal waveform either higher or lower and towards the condition of FIG. 2B where the response area of the signal conditioner will be stable and within the varying amplitude of the input waveform amplitude.

As shown, this portion of the signal conditioning section shown within this device allows the device to be used with a variety of input waveforms having varying amplitudes.

The signal conditioning section is shown as including a gate 25. However, it should be understood that any other suitable device responsive to the input varying waveform and to a feedback means may be used in place of the gate 25.

The signal at the output of the conditioner is then passed through a differentiation means formed by capacitor C3 and including pull-up resistor R3, providing a string of negative-going impulses through gate 27 to the first timing circuit of capacitor C4 and resistors R4 and R5. Two separate resistors, R4 and R5, are provided, so that the first timing circuit may be easily adjusted by replacing a single small valve resistor, to respond within a single cycle or one period of the input signal. The peak voltage at the capacitor C4 is essentially that of the zener diode D3 minus the drop through diode D1. The gate 27 can be a CMOS device with common inputs 12 and 13 such that the occurrence of a signal at output 10 of the gate 25 causes a positive pulse shown in 2D to appear coincident with the leading edge of signal 2C and a negative impulse appearing at the negative going edge of signal 2C. As will be apparent, these pulses occur around a level set by resistor R6 and zener diode D3, and the positive pulse will be clipped about one diode drop above this level by the input characteristics of gate 27.

A negative going impulse on terminals 12 and 13 of gate 27 produces a pulse for the duration of the impulse, at output terminal 11. This pulse charges capacitor C4 substantially without resistance through diode D1 so that capacitor C4 charges substantially coincident with the trailing edge of the high output at terminal 10 of the signal conditioner 25. As shown in FIG. 2F, capacitor C4 discharges through resistance R4 and R5 when the pulse 2E at the output terminal 11 is removed.

If the period of the first signal at terminals 23, 24 is sufficiently long corresponding to a predetermined speed, then capacitor C4 will discharge through R4, R5 to a voltage level corresponding to the threshold of gate 29 shown as Vf. That period shown as equal to $T_0+T_1$.

When the first signal or speed signal at terminals 23-24 has period less than $T_0+T_1$, then capacitor C4 will discharge below the threshold level of gate 29 causing it in turn to produce at its output a low-speed signal FIG. G, at terminal 4. This low-speed signal is an intermediate signal which is connected to a second section shown as gate 31 and second timing circuit C5, R7 and D2.

The gate 27 as shown in the preferred embodiment provides a charging voltage to capacitor C4 responsive to the falling edge of signal 2C. The low-speed signal FIG. G at terminal 4 of gate 29 then charges capacitor C5 through diode D2 within the period of the first signal at the predetermined limit speed and causes C5 to charge to the threshold of gate 31. Upon reaching this threshold h, FIG. H, gate 31 will switch from a high to low. A switch responsive to the signal at terminal 3 of gate 31, shown as 45, may be for example a Darlington amplifier which may be used to provide a speed limit output signal to operate any device.

This device may be used to operate a solenoid to maintain the throttle of an internal combustion engine at a fast idle position and prevent the engine from immediately reaching idling speed. In this way, the generation of noxious gases and pollution of the environment is avoided.

In a practical application, where the fast idle speed of the engine may be 500 revolutions per minute, this device may be adjusted to produce a speed limit signal at 900 revolutions per minute. In operation, the signal at the output of switch 31 would be high, and the fast idle solenoid would be engaged. When the speed of the engine dropped below 900 revolutions per minute, the predetermined speed limit, the signal at terminal 3 of complementary switch 31 would go from high to low deenergizing the solenoid and allowing the engine to reduce its speed to idling speed of 300 rev. per minute.

However, where the engine speed was above 900 revolutions per minute, this device would prevent quick release of the throttle from allowing the throttle to immediately go to its idle position while the engine speed is above 900 revolutions per minute and the generation of noxious gases.

As stated above, each of the complementary switches 25, 27, 29 or 31 may be complementary gates and particularly CMOS devices. Four CMOS devices are used to provide the requisite temperature and noise stability.

In operation of the device, resistances R4 and R5 may be adjusted such that the voltage on C4 will reach the threshold of the gate 29 within one period of the first input speed signal at terminals 23, 24.

Where it is desired to sense a speed limit as the speed increases from a lower level to a higher level and passes through said speed limit, then the circuit may be modified as would be obvious to one skilled in the art.

Where the speed limit signal indication is produced when the first speed signal increases reaching the predetermined limit speed and passing through said limit speed, then the same device can be used by calibrating the discharge time of C5 through R7 to reach the threshold level of logic gate 31 at said predetermined speed. In this case, the intermediate low speed signal will be continually present maintaining C5 fully charged until the limit speed is reached. At the limit speed and higher speeds, the low speed signal will disappear, allowing C5 to discharge through R7. If the time constant of C5-R7 allows C5 to discharge to a level below the threshold of gate 31, within the time period of the first speed signal at the said predetermined speed limit, then the output of gate 31 will switch causing a Darlington amplifier or similar device to produce a usable limit speed signal.

I claim:

1. A speed limiting indicating device for an internal combustion engine having:
   (a) an engine speed sensor providing a first signal indicative of engine speed;
   (b) means responsive to said first signal for providing a speed limit signal indicative of said engine speed exceeding a predetermined speed limit;
   (c) said speed limit signal means including logic gate means having its input connected to said first terminal for providing said speed limit signal at said predetermined limit speed;
   said logic gate means including at least first and second gates and first and second timing circuits;
   said first gate having its input connected to said first signal and to said first timing circuit and a second gate having its input connected to said second timing circuit and the input of said first gate and providing said speed limit signal at its output.

2. The device of claim 1, where said logic gate means includes a NOR gate.

3. The device of claim 1, wherein said logic gate means includes a CMOS device having its inputs connected in parallel and in common to said first signal.

4. The device of claim 1, wherein said first timing circuit is adjustable to produce said speed limit signal within one period of said first signal when said first signal is at said predetermined limit speed.

5. The device of claim 4, wherein:
   said first gate has a threshold, said first timing circuit being adjustable to produce said threshold signal for said first gate within a period of said first signal at said predetermined limit speed and producing an intermediate speed limit signal at the output of said first gate,
   said second gate having a threshold and said second timing circuit being adjustable to produce said threshold signal for said second gate at said predetermined speed limit and responsive to said intermediate speed limit signal.

6. The device of claim 5, wherein said logic gates are complementary gates.

7. The device of claim 6, wherein said complementary gates are CMOS devices.

8. A speed limit indicating device which is responsive to a range of time-varying periodic speed signals, and capable of producing a speed limit signal indicative of a predetermined speed and responsively to speed signals having separate respective amplitudes within a range and comprising means for providing a first periodic time varying signal indicative of speed, means responsive to said time varying signal for providing said speed limit signal indicative of said speed exceeding said predetermined speed;
   said speed limit means including a signal conditioning means providing a second periodic time-varying wave form indicative of engine speed, said signal conditioning means including a logic gate and feedback means connected between the input and output of said logic gate, said feedback means providing feedback to drive the amplitude of said speed signal towards the responsive area of said logic gate.

9. The device of claim 8, wherein said logic gate comprises complementary switches with inputs connected in common, said gate response area being a threshold level and said feedback means providing a bias to said gate input to drive the said varying amplitude speed signal towards said threshold level.

10. The device of claim 9, wherein said gate is a NOR gate.

11. The device of claim 10, wherein said logic gate produces a first output responsive to said signal at said input crossing said threshold in first direction and a second output in response to said signal at said input crossing the said threshold, in a second direction, said feedback means providing a bias in response to said output to cause said gate to switch substantially at the same level of said input signal.

12. The device of claim 11, wherein said feedback means is a resistive means connected between the output of said gate and the input of said gate.

13. A speed limiting indicating device comprising
 (a) first means for sensing rotational speed and providing a first signal having a varying amplitude and being indicative of said rotational speed
 (b) a first logic gate, having its input connected to a timing circuit and to said first signal, said first timing circuit being adjustable to provide a threshold signal to said first gate, said first gate having its output changing in response to said threshold signal;
 (c) a second gate, and a second timing circuit, said second gate having its input connected to said second timing circuit and to the output of said first gate, said second timing circuit producing a threshold signal responsive to the output of said first gate, and said second gate having a changing output in response to said threshold signal produced by said second gate, said output of said second gate being indicative of said rotational speed being at a predetermined limit speed.

14. The device of claim 13 including a third gate having its input connected to said first signal and its output connected to said first timing circuit, said third gate including a feedback means connected between its output and its input to provide a bias to said input and to drive said first signal towards the threshold of said third gate.

15. The device of claim 14, wherein said gates are CMOS devices having their inputs connected in parallel, and including a fourth gate, having a threshold, and with its input connected to the output of said third gate, and its output connected to said first timing circuit, said fourth gate producing an output in response to said output at said third gate passing through the said threshold of said fourth gate.

16. The device of claim 15, wherein the output of said first gate is an intermediate limit speed signal, said second timing circuit producing an increasing signal level in response to the presence of said intermediate signal level and said second gate changing its output in response to said second timing circuit signal level crossing the threshold of said second gate.

* * * * *